United States Patent [19]

Stock et al.

[11] 4,353,427

[45] Oct. 12, 1982

[54] WEIGHT-SENSOR CALIBRATION FOR GRAVIMETRIC COAL FEEDER

[75] Inventors: Arthur J. Stock, Lakewood; Donald S. Christopher, Willowick, both of Ohio

[73] Assignee: Stock Equipment Company, Cleveland, Ohio

[21] Appl. No.: 190,963

[22] Filed: Sep. 26, 1980

[51] Int. Cl.[3] ............... G01G 19/52; G01G 11/14; G01L 25/00
[52] U.S. Cl. ........................... 177/50; 177/16; 73/1 B
[58] Field of Search ............... 177/50, 145, 16; 73/1 B

[56] References Cited

U.S. PATENT DOCUMENTS

| | | | |
|---|---|---|---|
| 3,405,774 | 10/1968 | Laroche | 177/50 X |
| 3,656,337 | 4/1972 | McDonald | 177/50 X |
| 3,738,439 | 6/1973 | Herbert | 177/50 |
| 3,850,023 | 11/1974 | McDonald | 177/50 X |
| 3,976,150 | 8/1976 | Wilson et al. | 73/1 B X |

*Primary Examiner*—George H. Miller, Jr.
*Attorney, Agent, or Firm*—Pearne, Gordon, Sessions, McCoy & Granger

[57] ABSTRACT

A device for selectively applying a test load to a weight-sensing control mechanism in an enclosed conveyor unit for feeding particulate material at a controlled rate. The weight-sensing mechanism continuously senses the weight of a variable quantity of material such as coal being conveyed through a predetermined reference zone and one or more load cells generate a voltage signal representative of the weight being sensed. The test load may be supported in the conveyor unit in either of two positions including a first position wherein it is supported independently of the weight-sensing mechanism and a second position wherein it is transferred to the weight-sensing mechanism for the purpose of calibration. The device includes a transverse shaft journaled in the conveyor unit and a pair of eccentric hubs mounted at opposite ends of the shaft, each hub being rotatably received in a connecting head portion of one of a pair of support rods adapted to suspend the test load. Thus, rotation of the shaft and eccentric hubs causes the test load to be transferred between its two positions so as to transfer the weight of the test load to the weight-sensing mechanism for the purpose of calibration. The transfer is accomplished by an operator at a location outside the enclosed conveyor unit.

8 Claims, 6 Drawing Figures

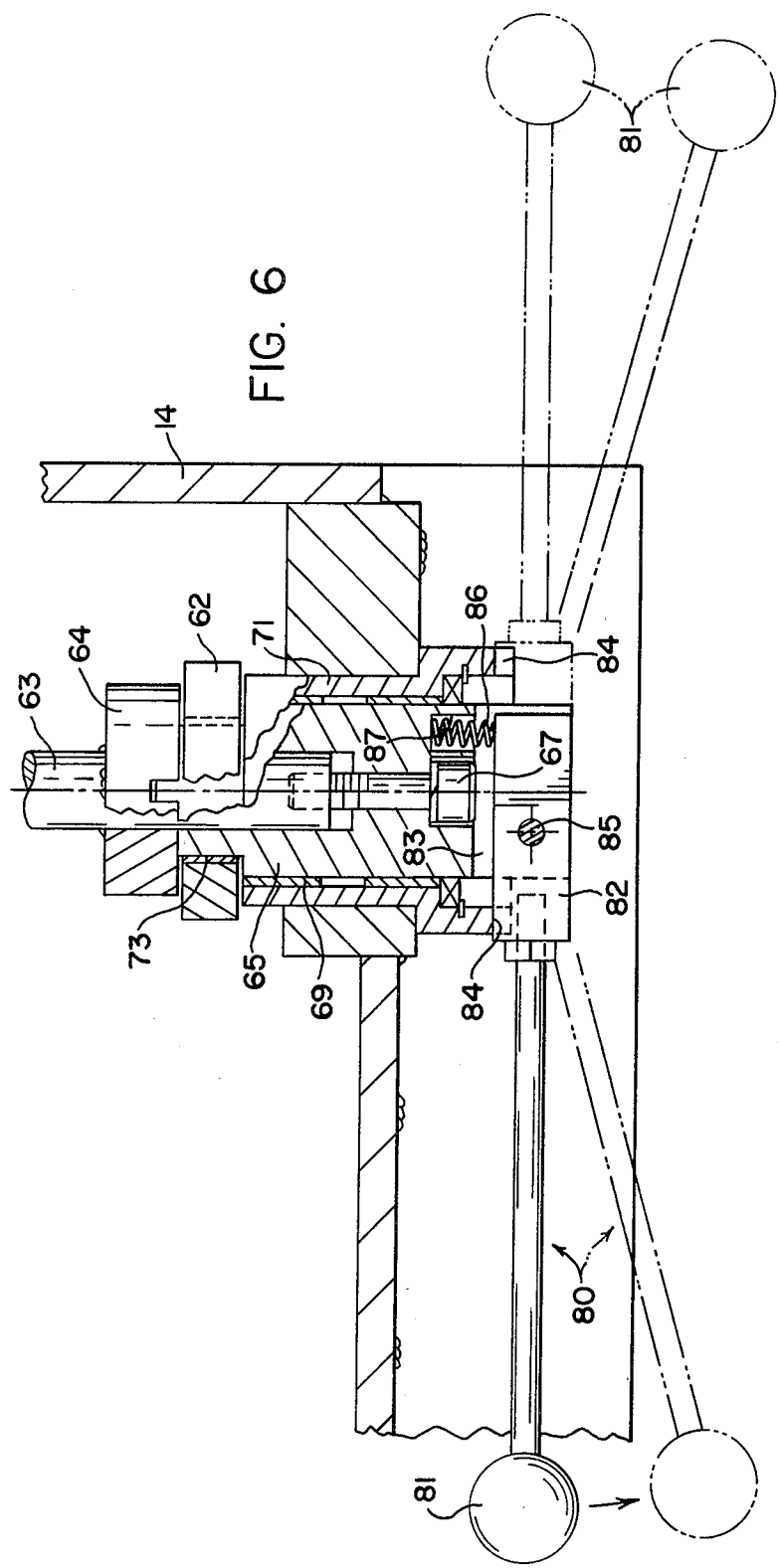

WEIGHT-SENSOR CALIBRATION FOR GRAVIMETRIC COAL FEEDER

BACKGROUND OF THE INVENTION

This invention relates to apparatus for feeding particulate material, such as coal particles, to be burned in a coal combustion system in an electrical power plant in which the coal is fed at a controlled rate to a furnace or other component. More particularly, the invention relates to a gravimetric feeder whose rate of feed is monitored and automatically controlled, and especially to a device for calibrating the weight-sensing and feed rate control system.

Although the present invention is particularly adapted for feeding coal in electrical power plants, the invention is useful in the feeding of particulate material in general and it is not intended that the basic concept of the invention be restricted to feeding coal.

In many coal-fired electrical power plants, coal is fed downwardly by gravity from overhead hoppers or bunkers to pulverizers or other power plant components such as boiler stokers or cyclone burners. The feed rate may be controlled by a gravimetric feeder such as that shown and described in U.S. Pat. No. 3,187,944, the disclosure of which is incorporated by reference herein and made a part hereof.

Generally, the gravimetric feeder receives the particulate coal in the form of a continuous stream in a fixed flow path, and delivers the coal at a controlled rate as free-falling or separately flowing particles. The rate of discharge by weight is controllable to achieve accurate control of the fuel-air ratio. A feeder of this type enables the coal flow to be divided equally among several firing units of a single boiler.

Such feeders utilize a horizontal conveyor located within a sealed enclosure and adapted to contain gas at a pressure higher than ambient atmospheric air pressure. The conveyor includes an endless belt with an upper span or run that receives coal through an inlet in the enclosure in the form of a column from the hopper. The upper belt run transports a layer of the coal at a level controlled by an adjustable leveling bar or valve across a weighing span of predetermined length, which weighing span is supported by one or more rollers, one roller being a weighing roller. The weighing roller thus carries a predetermined portion of the weight of coal on the weighing span and the weight carried thereby is sensed by a weight-sensing mechanism including, for example, load cells of the type readily obtainable from commercial sources. If the weight sensed varies from that desired, then the weighing mechanism automatically moves the leveling bar to adjust the depth (and thus the weight) of coal transported on the belt.

It is particularly important in order to assure accurate feed rate control that the weighing mechanism be accurately calibrated. Over a period of time, the mechanism tends to change its condition of adjustment due to vibration, wear, environmental conditions, etc. Accordingly, it is desirable that the equipment have provision for applying a test load to the mechanism at frequent intervals with a minimum of effort in order to check calibration and make any necessary adjustments.

The apparatus of the present invention satisfies the requirements indicated and affords other features and advantages heretofore not obtainable.

SUMMARY OF THE INVENTION

It is among the objects of the invention to calibrate a gravimetric coal feeder by applying to the weighing mechanism thereof a test load located within the sealed feeder enclosure, from an outside operating position.

Another object is to provide a mechanism of reduced complexity for applying a test load for calibration purposes to a gravitmetric coal feeder weighing mechanism.

Still another object is to transfer a test load from an independently supported condition within a gravimetric coal feeder enclosure to a calibrating position where it is supported by a weight-sensing mechanism.

These and other objects are achieved with the novel device of the present invention which is adapted to selectively apply a test load to a weight-sensing mechanism in an enclosed conveyor unit for feeding material such as coal at a controlled rate. The weight-sensing mechanism includes means for continuously sensing the weight of a variable quantity of material being conveyed through a predetermined reference zone and load cells for generating a voltage signal representative of the weight sensed.

The device includes a control shaft journaled in the conveyor unit and having its axis transverse to the direction of feed. A pair of circular eccentric hubs are mounted on the shaft at spaced locations from and coaxial with one another on opposite ends of the shaft and with their common axis offset from the axis of the shaft. A pair of support rods having ring-shaped connecting heads are carried by the eccentric hubs so that they are lifted and lowered with rotation of the control shaft between raised and lowered positions. The test load is adapted to be supported by and between the support rods and means are provided for rotating the shaft between a first position wherein the center of the hubs is above the axis of the shaft and a second position wherein the axis of the hubs is below the axis of the shaft whereby when the shaft is in its first position, the test load is supported by the rods, and when the shaft is in its second position, the test load is lowered by the rods and the weight thereof is transferred to the weight-sensing mechanism for the purpose of applying a test load for calibrating the control system.

BRIEF DESCRIPTION OF THE DRAWINGS

FIG. 6 is a fragmentary horizontal sectional view taken on the line 6—6 of FIG. 3.

DESCRIPTION OF THE PREFERRED EMBODIMENT

Figure 1:
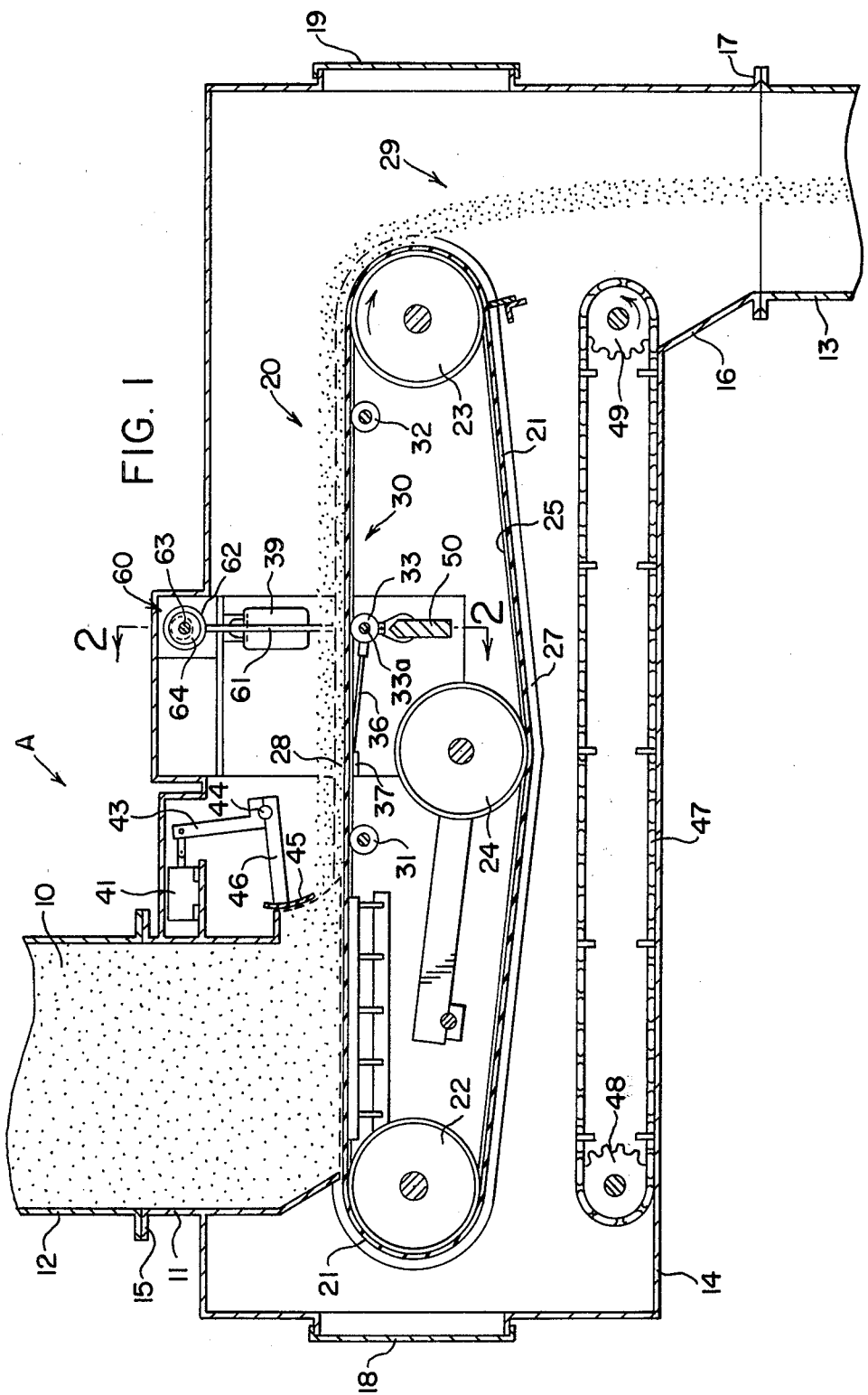
FIG. 1 is a central longitudinal sectional view through a gravimetric feeder embodying the invention.
Figure 2:
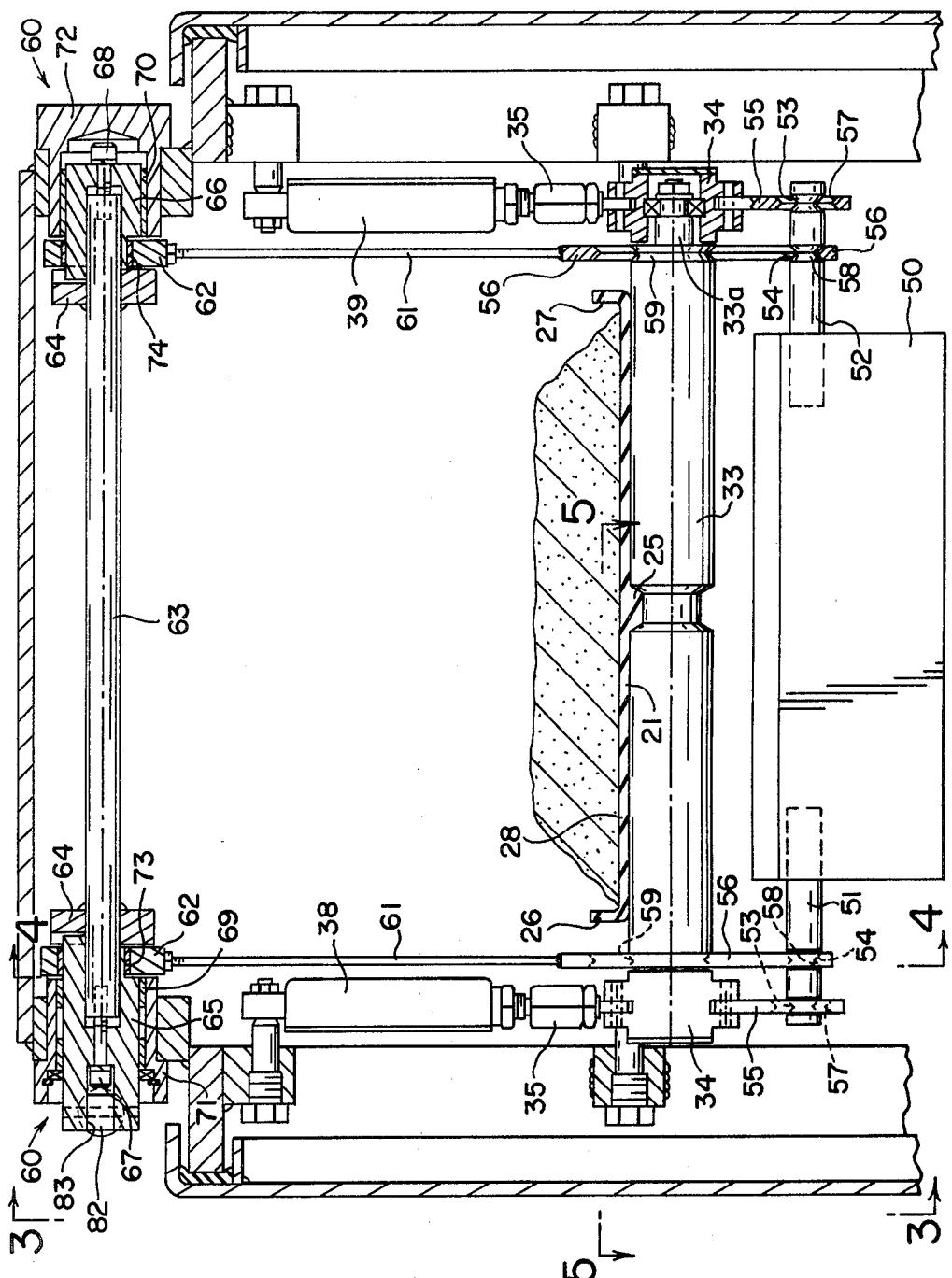
FIG. 2 is a fragmentary sectional view on an enlarged scale taken on the line 2—2 of FIG. 1.

Referring more particularly to the drawings and initially FIGS. 1 and 2, there is shown a gravimetric coal feeder A adapted to receive a column 10 of particulate coal through an inlet conduit 11, from a hopper 12. The apparatus A feeds the coal from the column 10 at a controlled rate of flow to a discharge chute or conduit 13 at the right-hand end as viewed in FIG. 1. The coal is delivered to the discharge chute as free-falling or separately flowing particles and the rate of flow is controllable in terms of the weight of the material being discharged.

The apparatus A includes an elongated housing 14 with an upwardly facing inlet 11 having an annular flange 15 at the top for use in connecting the inlet 11 to the outlet of the hopper 12. The housing 14 also has a downwardly facing outlet 16 with an annular flange 17 at its lower end for use in bolting the outlet 16 to the discharge chute 13. The housing 14 may be formed, for example, of steel of suitable strength. Access doors 18 and 19 are located at the opposite ends of the housing 14 to permit access to the interior of the feeder A.

A feeder conveyor generally indicated by the numeral 20 is located within the housing and combines an endless belt 21 formed of molded, fabric-reinforced rubber that passes between a power-driven head pulley 22 and a tail pulley 23. Tension in the belt 21 is maintained by a tension roller 24. The belt 21 has a central V-shaped rib 25 formed in the inside thereof that seats in V-shaped grooves in the head pulley 22, tail pulley 23 and tension roller 24. Also, the belt 21 has projecting curbs 26 and 27 formed on opposite edges thereof to guide the coal carried thereon and to minimize overflow of the coal at the sides of the belt. The head pulley 22 is driven by a variable-speed motor (not shown) and the speed of the output shaft of the motor is normally controlled by an electrical voltage furnished by combustion control means for the furnace to which coal is supplied by the feeder.

As indicated in FIGS. 1 and 2, a layer of coal is carried from left to right as viewed in FIG. 1 from the bottom of the column 10 across the upper span 28 of the endless belt 21 to an exit or drop-off zone 29 at the right-hand end of the span 28.

Figure 3:
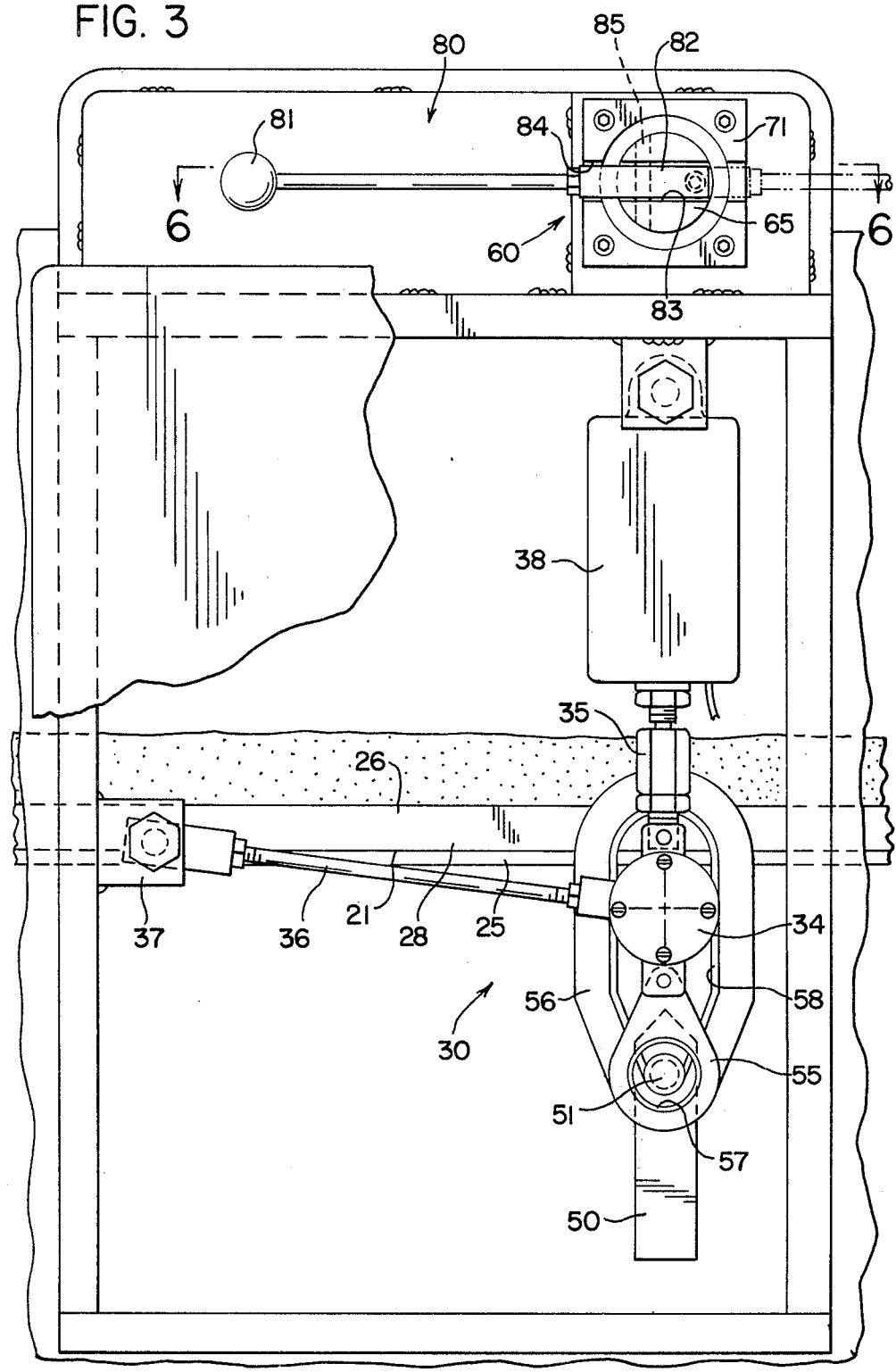
FIG. 3 is a fragmentary sectional view taken on the line 3—3 of FIG. 2 with parts broken away and shown in section for the purpose of illustration.

The control of the rate of flow of coal from the column 10 to the exit zone 29 is acomplished by means of a gravimetric feed system 30, the particulars of which are more specifically shown and described in the aforesaid U.S. Pat. No. 3,187,944. Briefly stated, the gravimetric feed system 30 comprises three parallel, equally spaced apart rollers, including a pair of weigh span rollers 31 and 32 and a weighing roller 33 located between the rollers 31 and 32. The weighing roller 33 has a central shaft 33a journaled in bearing assemblies 34 at its opposite ends. The roller 33 and bearing assemblies 34 are supported by a pair of weighing roller support assemblies 35 located on opposite sides of the upper span 28 of the belt 21 (FIGS. 2 and 3). Also, the bearing assemblies 34 are connected to one end of an arm or link 36 extending generally horizontally and pivoted at its opposite end in a bracket 37. The arm 36 serves to locate the weighing roller 33 in its desired longitudinal position relative to the upper span 28. It will be noted that other components of the gravimetric control system are shown diagrammatically in FIG. 1.

The upper ends of the weighing roller support assemblies 35 are connected to load cells 38 and 39 which are adapted to sense either an overweight or an underweight condition with reference to the weight of the coal in the weighing span of the upper span 28 of the belt 21 between the weigh span rollers 31 and 32. The load cells 38 and 39 have an output voltage that is used to control an electric motor 41 (FIG. 1). The motor 41 turns a screw operatively connected to an arm 43 of a crank that swings about a pivot 44.

A leveling bar 45 carried on an arm 46 of the crank substantially perpendicular to the arm 43 is positioned at the upstream end of the column 10 of coal in the inlet 11 and regulates, through its raising and lowering movement, the level (and thus the weight) of the layer of coal carried from the column by the upper span 28 of the endless belt 21. The gravimetric control system which is illustrated generally in schematic form in FIG. 1 is shown and described in more detail in U.S. Pat. No. 3,187,944.

Some coal may fall from the sides of the belt 21 and, therefore, a cleanout conveyor (FIG. 1) is provided and mounted with its lower span immediately above a floor section that extends all the way to the outlet 16 of the housing 14. The cleanout conveyor extends horizontally beneath the conveyor 20 to the outlet 16 and comprises a pair of parallel chains 47 extending between pairs of parallel, power-driven head sprockets 48 and tail sprockets 49. Certain links of the chains 47 carry transversely extending, spaced parallel cleanout bars that move across and contact the floor to move accumulated spilled coal and discharge it into the discharge chute 13.

For the purpose of calibrating the gravimetric feed control system 30, a test load in the form of a calibrating weight 50 is provided. This load may be applied to the weighing mechanism when the feeder A is not in operation and when there is no coal carried on the upper span 28 of the belt 21. The calibrating weight 50 is a flat steel plate with its top edge beveled on both sides to a point so that coal particles or other debris cannot accumulate thereon to change the weight to be applied for calibration purposes. The calibrating weight 50 is normally carried during operation of the feeder A in an independently supported condition as illustrated in FIGS. 1, 2, 3 and 4 (solid lines), but it may be lowered by the mechanism of the invention to a calibrating position wherein its weight is transferred from its independently supported condition to the load cells 38 and 39 for the purpose of calibrating the gravimetric feed control system 30.

The calibrating weight 50 has laterally extending carrier pins 51 and 52 at its opposite ends that are used to support the weight in both of its positions. Each of the pins 51 and 52 has an annular outer groove 53 and an annular inner groove 54, the grooves having a generally V-shaped cross section. A pair of hanger loops 55 attached to the bearing assemblies 34 engage the pins 51 and 52 and support the calibrating weight 50 when it is moved to its calibrating position so that the weight of the calibrating weight 50 is applied through the bearing assemblies 34 and weighing roller support assemblies 35 to the load cells 38 and 39.

When the feeder A is in operation, the carrier pins 51 and 52 are engaged and supported by a pair of hanger loops 56 so that the load cells 38 and 39 are relieved of the load of the calibrating weight 50.

The interior edges 57 of the opening in the hanger loops 55 are provided with a knife-edge shape that engages in the outer annular grooves 53. The interior edges 58 of the opening in the hanger loops 56 are provided with a knife-edge shape that engages in the inner annular grooves 54 of the pins 51 and 52. Also, the knife-edge shaped edges 58 of the hanger loops 56 engage in annular grooves 59 at opposite sides of the weighing roll 33 in order to restrain lateral swinging movement of the calibrating weight 50.

The openings in the hanger loops 55 are circular and have a diameter substantially larger than the diameter of the carrier pins 51 and 52. The openings in the hanger loops 56 have an elongated irregular shape as best shown in FIG. 4.

Figure 4:
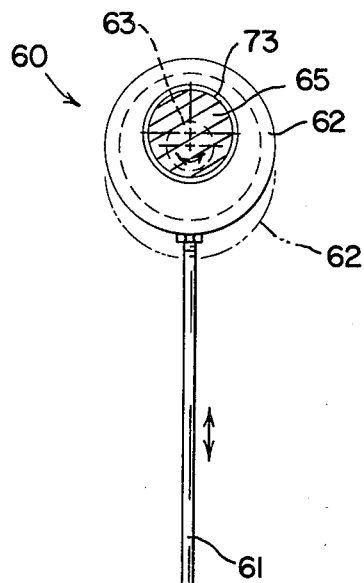
FIG. 4 is a fragmentary sectional view taken on the line 4—4 of FIG. 2.
Figure 4:
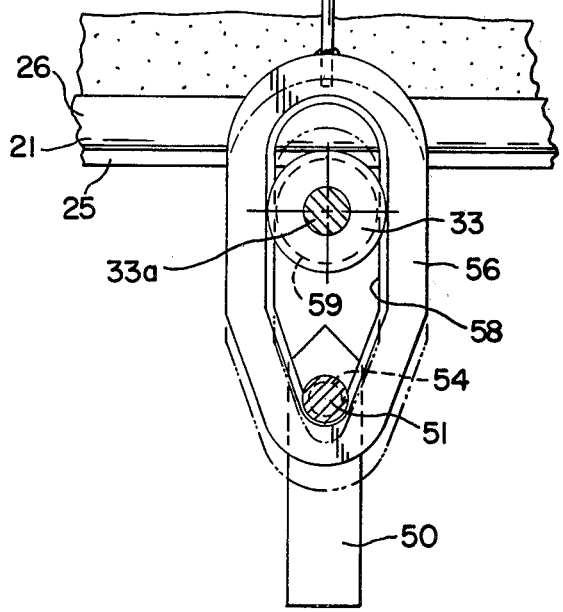
Figure 5:
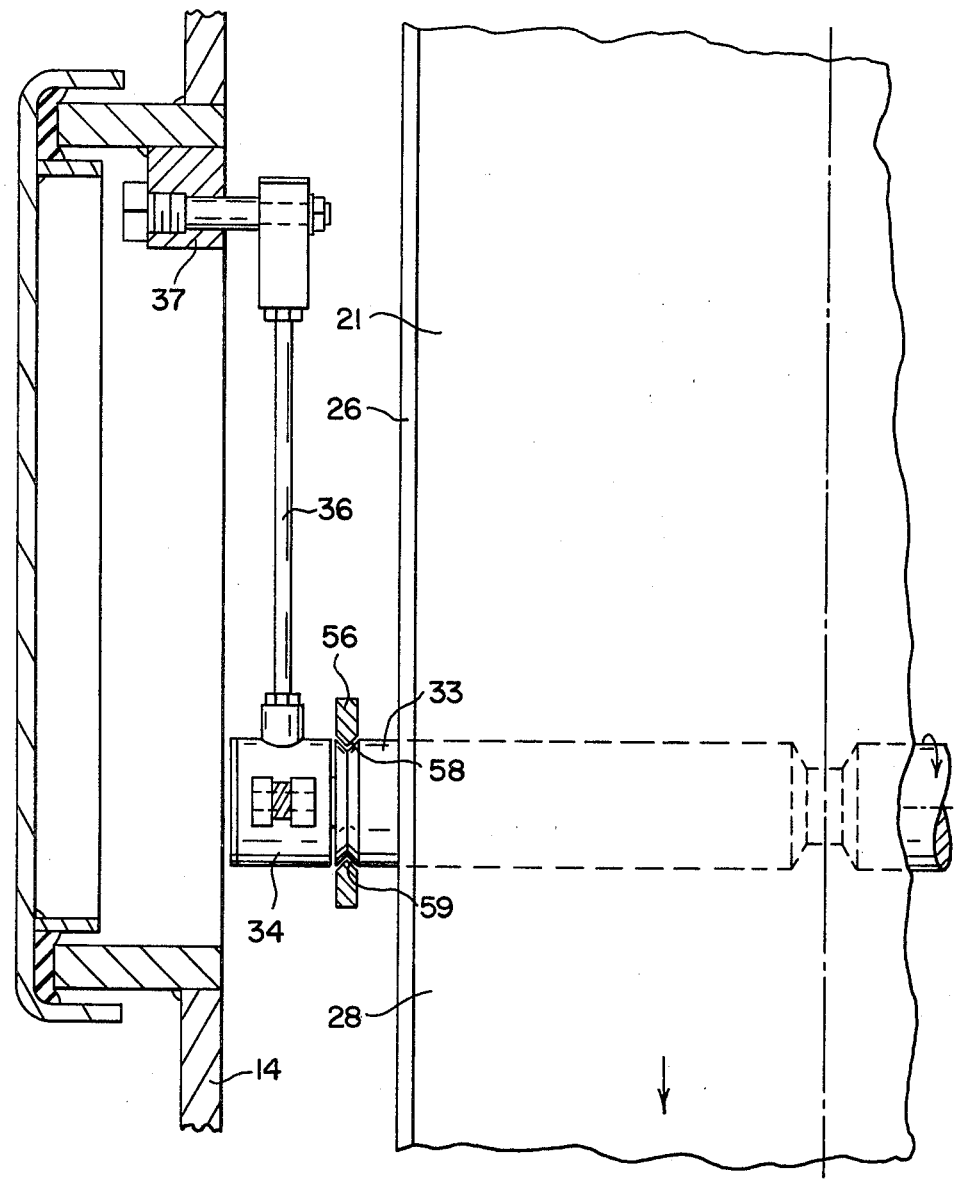
FIG. 5 is a fragmentary sectional view taken on the line 5—5 of FIG. 2.

The hanger loops 56 are attached to operating mechanisms 60, best shown in FIGS. 3, 4 and 6, by vertical hanger rods 61, best shown in FIGS. 2 and 4. The upper ends of the hanger rods 61 have connecting heads 62 that cooperate with the respective supporting and operating mechanism 60 to raise and lower the calibrating weight 50 between its two positions.

The lifting and lowering function is accomplished by the operating mechanism 60 located at the top of the feeder A and which includes a laterally extending shaft 63 with retaining flanges 64 welded at each end. A pair of hubs 65 and 66 are fixed to the shaft 63 at its opposite ends adjacent and keyed to the respective retaining flanges 64. The hubs 65 and 66 are secured against lateral movement by screws 67 and 68 which urge the respective hubs 65 and 66 against the retaining flanges 64.

The hubs and shaft assembly are adapted for rotary movement, the hubs 65 and 66 being journaled in bearing assemblies 69 and 70 mounted in bearing blocks 71 and 72 secured to the housing 14. The hubs 65 and 66 have inwardly extending, eccentric circular cams 73 and 74 on their inner ends which engage the circular openings in the connecting heads 62.

Accordingly, rotation of the shaft 63 and hubs 65 and 66 causes orbiting movement of the eccentric cams 73 and 74 and their respective heads 62 with a resulting vertical component of movement for the vertical hanger rods 61 and correspondingly of the carrier pins 51 and 52 and calibrating weight 50. The calibrating weight 50 is shown in its normal noncalibrating position in FIGS. 2, 3, 4 and 6 in solid lines and in its test load applying position in dashed lines.

The movement of the operating mechanism 60 in order to lift and lower the calibrating weight 50 is accomplished by means of an operating lever 80 having a handle 81 and a pivot block 82. The pivot block 82 is received in a lateral slot 83 in the outer end of the hub 65 and also a portion thereof is normally received in a lateral slot in the bearing block 71. The operating lever 80 is mounted for pivotal movement by a pivot pin 85 which extends between opposite sides of the slot 83 so that the operating lever is capable of limited sideways (as opposed to rotary) movement as indicated by the arrows and angularly disposed dashed line positions shown in FIG. 6.

The inner end of the pivot block 82 is engaged by a helical spring 86 which urges the lever 80 to its radially extending position with the pivot block 82 seated in both the slot 83 in the hub 65 and the slot 84 in the bearing block 71 to lock the lever 30 against rotary movement. The spring 86 is seated in a longitudinally extending recess 87 in the hub 65.

When the lever 80 is moved outward as shown by the arrow in FIG. 6, the pivot block 82 moves out of the slot 84 in the bearing block 71 so that the operating lever may be swung in a circular path through an 180° arc to carry the shaft 63 and hubs 65 and 66 from a position wherein the axis of the eccentric cams 73 and 74 is located above the axis of the shaft and hubs to a position where the axis of the eccentric cams 73 and 74 is located below the axis of the shaft and hubs. This position is shown in dashed lines in FIG. 6 and when in this position, the lever 80 is returned to the radial position in response to the force of the spring 86 so that the pivot block 82 seats in the slot 84 in the bearing block 71 to lock the shaft 63 and hubs 65 and 66 in the new position.

With the shaft and hub assembly in this position, the connecting heads 62 for the rods 61 are lowered as indicated by the dashed lines in FIG. 4. This movement, in turn, lowers the hanger loops 56 and the carrier pins 51 and 52 until the pins engage the hanger loops 55. The hanger loops 56 move down somewhat further beyond this point so that the weight of the calibrating weight 50 is transferred to the load cells 38 and 39.

This test load applying procedure is accomplished when the movement of the conveyor has been halted and when there is no pulverized coal carried on the conveyor belt 21 so that the only load being sensed in addition to the weight of the weighing span of the conveyor belt is that of the calibrating weight 50. In this condition, the load cells 38 and 39 send a voltage signal to the feed rate control system so that the system 30 can be calibrated to achieve the proper adjustment.

While the invention has been shown and described with respect to a specific embodiment thereof, this is intended for the purpose of illustration rather than limitation and other variations and modifications of the specific device herein shown and described will be apparent to those skilled in the art all within the intended spirit and scope of the invention. Accordingly, the patent is not to be limited in scope and effect to the specific embodiment herein shown and described, nor in any other way that is inconsistent with the extent to which the progress in the art has been advanced by the invention.

What is claimed is:

1. A device for selectively applying a test load to a weight-sensing mechanism that includes means for continuously sensing the weight of a variable operating load and means for generating a signal representative of the weight sensed by said means, said device comprising:

a calibrating weight;

a control shaft located above said weight sensing mechanism, at least one vertical support rod operatively connected to said control shaft at its upper end and connected to said calibrating weight at its lower end, and means for rotating said shaft about its axis between a first position wherein said calibrating weight is supported by said vertical rod and a second position wherein the weight of said calibrating weight is transferred to said weight sensing mechanism.

2. A device as claimed in claim 1, wherein said vertical support rod is connected to said control shaft through an eccentric member.

3. A device as defined in claim 2, including two of said eccentric members spaced apart from one another on said shaft and two of said vertical support rods, one rod being connected to one of said eccentric members and the other rod being connected to the other of said eccentric members, said calibrating weight being located between said two vertical rods.

4. A device as defined in claim 3, wherein said weight sensing mechanism includes a roller journaled at its ends in bearing assemblies that are operatively connected to said load cell means and further comprising means connected to said bearing assemblies and operatively associated with said calibrating weight whereby when said shaft is in said second position the weight of said calbrating weight is transferred from said vertical rods to said load cell means.

5. A device as defined in any of claims 2, 3, or 4, wherein said means for rotating said shaft about its axis comprises a lever connected to one end of said shaft and adapted to be turned through an arc between limit positions, and detent means for retaining said lever in said limit positions.

6. A device as defined in any of claims 2, 3, or 4, wherein said weight sensing mechanism, said load cell means, said calibrating weight, said eccentric member, and said support rod are located in an enclosure and wherein said means for rotating said shaft is located externally of said enclosure.

7. A device for selectively applying a test load to a weight-sensing mechanism in an enclosed conveyor unit for feeding material at a controlled rate, said weight-sensing mechanism including means for continuously sensing the weight of a variable quantity of material being conveyed through a predetermined reference zone and load cell means for generating a voltage signal representative of the weight sensed by said means, said device comprising
 a calibrating weight,
 a control shaft journaled in said conveyor unit and having its axis transverse to the direction of feed,
 a pair of circular eccentric members mounted on said shaft at spaced locations from and coaxial with one another on opposite ends of said shaft and with their common axis of eccentricity offset from the axis of said shaft,
 a pair of vertical support rods one being operatively connected to one of said eccentric members and the other being operatively connected to the other of said eccentric members, said calibrating weight being adapted to be supported by and between said support rods,
 means for rotating said shaft between a first position wherein the axis of eccentricity of said eccentric members is above the axis of said shaft and a second position wherein the axis of eccentricity of said eccentric members is below the axis of said shaft whereby when said shaft is in said first position said calibrating weight is supported by said rods and when said shaft is in said second position said calibrating weight is lowered by said rods and the weight thereof is transferred to said weight-sensing mechanism.

8. In a gravimetric feeder having a belt conveyor for conveying particulate material to a delivery zone, said conveyor embodying a weighing span supported by a plurality of rollers, one of said rollers being a weighing roller, said weighing roller being supported by a weight sensing mechanism embodying load cells adapted to generate a signal representative of the weight supported by said weighing roller, the improvement which comprises a device for selectively applying a test load to said weight sensing mechanism comprising:
 a calibrating weight;
 a control shaft located above said weight sensing mechanism;
 vertical support means operatively connected to said control shaft at its upper end and to said calibrating weight at its lower end; and
 means for rotating said shaft about its axis between one position wherein the weight of said calibrating weight is transferred to said weight sensing mechanism when it is desired to calibrate said weight sensing mechanism and another position wherein said calibrating weight is supported by said vertical support means for supporting said calibrating weight independently of said weight sensing mechanism during normal operation of said feeder.

* * * * *